United States Patent [19]
Kamentser et al.

[11] Patent Number: 5,811,694
[45] Date of Patent: Sep. 22, 1998

[54] FORCE TRANSDUCER

[75] Inventors: Boris Kamentser, Fountain Valley; Eugenia Kamentser, Garden Grove, both of Calif.; Michael C. Scofield, Salt Lake City, Utah

[73] Assignees: Bokam Engineering, Santa Ana, Calif.; Bourns, Inc., Ogden, Utah

[21] Appl. No.: 870,636

[22] Filed: Jun. 6, 1997

[51] Int. Cl.$^6$ .................................................. G01L 5/16
[52] U.S. Cl. .............................. 73/862.045; 73/862.632; 340/407.2; 361/222
[58] Field of Search ....................... 73/862.621, 862.622, 73/862.632, 862.041, 862.042, 862.05; 340/407.2; 345/160, 161; 400/490; 361/220, 222

[56] References Cited

U.S. PATENT DOCUMENTS

| | | | |
|---|---|---|---|
| 4,536,746 | 8/1985 | Bobeli et al. ........................ | 73/862.05 |
| 5,489,900 | 2/1996 | Cali et al. ................................ | 341/34 |
| 5,521,596 | 5/1996 | Selker et al. ............................... | 341/22 |

Primary Examiner—Ronald L. Biegel
Attorney, Agent, or Firm—Leonard Tachner

[57] ABSTRACT

A force transducer having a post connected to an underlying substrate having a plurality of strain gauges, is protected from otherwise damaging static electric discharge current using a grounding guard. The guard is preferably a flat conductive member having an aperture for receiving the post and a tab for connection to electrical ground. The guard surrounds the post and overlays the substrate to channel such current away from delicate strain gauges and other electronics. In the preferred embodiment the aperture is formed by bending up a plurality of flaps cut into the guard and bent up to receive the post in press-fit engagement.

10 Claims, 2 Drawing Sheets

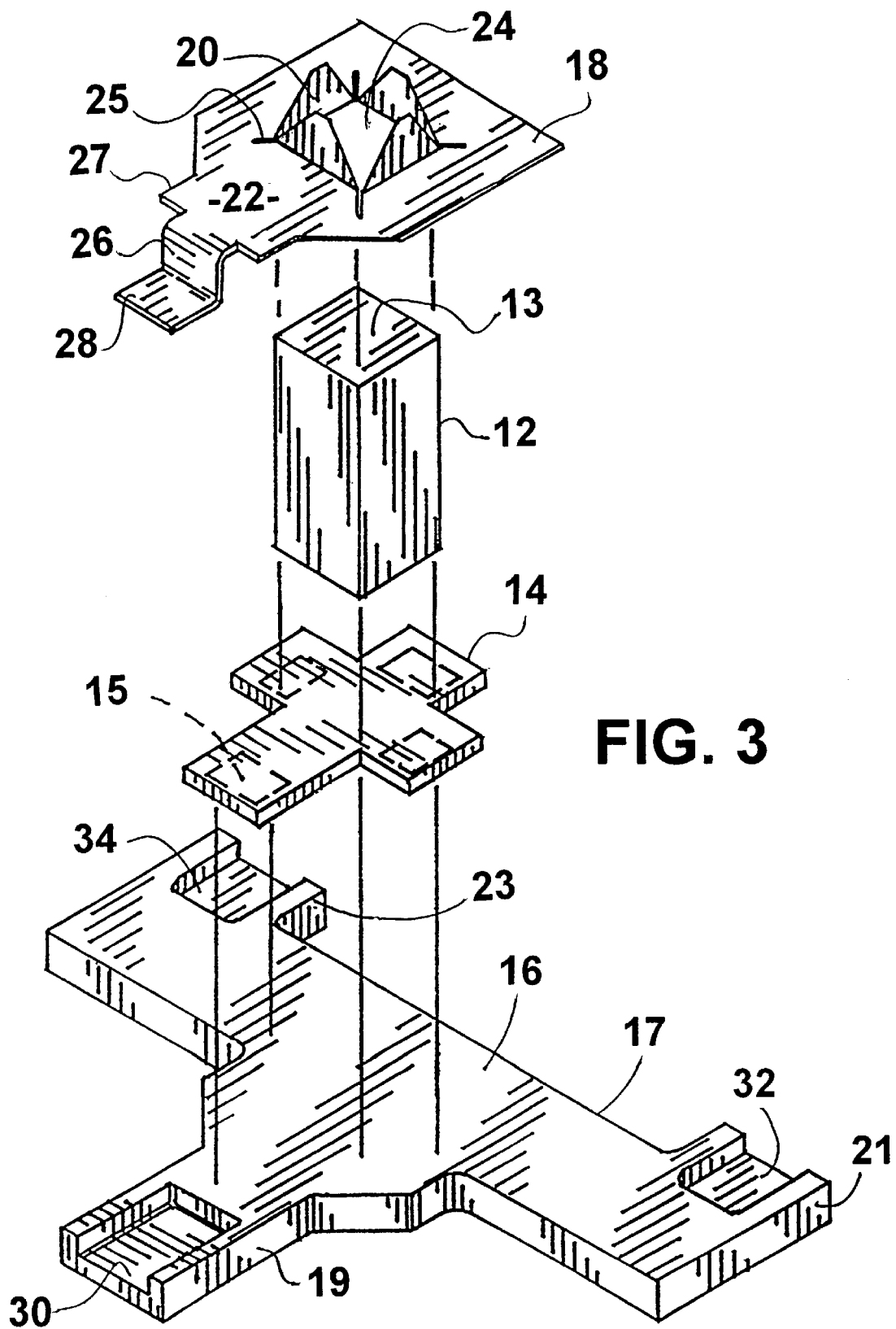

FORCE TRANSDUCER

BACKGROUND OF THE INVENTION

1. Field of the Invention

The present invention relates generally to the field of transducers and associated electronics and mechanical structure for converting force exerting in selected directions to corresponding electrical signals such as for manual control of a computer display cursor. More specifically, the present invention relates to an improved force transducer of the type having an elongated post affixed or integral to a ceramic substrate having a plurality of film-type strain gauges mounted thereon for generating an electrical manifestation corresponding to force applied to the post. The improvement of the invention resides in an electrical grounding guard that is configured to surround the base of the post and protect the transducer and associated electronics from discharge of static electric current.

2. Prior Art

Static electric current discharge is the bain of the computer industry. Circuits designed to operate at low voltages and currents are especially susceptible to the large momentary currents that can be induced by static charge. Printed circuit board cards which use very small fragile components and extremely thin and narrow printed wiring, are particularly vulnerable and need to be protected from static discharge such as when they are handled by human operations, installers, etc. Component and circuit board vendors now virtually all use metalized plastic bags to ship their products to minimize the risk of static electric discharge. Most such vendors even enclose written instructions cautioning their customers to exercise care when handling the products to avoid damaging static discharge while installing a component or card.

Unfortunately, there are some circumstances where frequent human contact with a component cannot be avoided and, in fact, is a prerequisite of the component's operation. One such circumstance is found in components designed to be manipulated by human contact such as computer keyboards, mouse controllers and external switches and controls on a chassis such as the front panel of a computer housing. Such devices must be provided with some form of electrical grounding protection so that static electrical energy that may be discharged upon human contact, may be safely channeled to electrical ground within the device thereby preventing large discharge-induced currents from damaging sensitive electrical components.

One particular device that has heretofore proven to be difficult to protect against static electric discharge is a force transducer used for example on small computer keyboards to convert manually applied forces to corresponding electrical signals to control a computer display cursor. Such a force transducer uses an elongated post affixed or integral to an underlying substrate on which there are mounted a plurality of generally planar strain gauges. The gauges respond to small mechanical bending of the substrate induced by slight manipulation of the post. The response is normally in the form of resistance changes in the strain gauges which are measured in a bridge circuit and used to control video circuits for positioning a display cursor. One typical such force transducer is disclosed and fully explained in U.S. Pat. No. 5,780,750 which is incorporated herein by reference. The small size of such a device and more importantly, the immediate proximity of the manually operated post and sensitive electrical components (i.e., strain gauges) have made the aforementioned force transducer especially problematic in regard to solving the static electric discharge issue.

SUMMARY OF THE INVENTION

The present invention provides a simple but novel and elegant solution to the problem of preventing damage to post-type force transducers by static electric discharge. Its simplicity is evident by the fact that it comprises a unitary, electrically conductive, shaped planar member having an aperture substantially congruent to the cross-section of the post to which it is affixed. The aperture is preferably formed by cutting and bending up a plurality of flaps from the planar member itself. The flaps provide adequate press-fit engagement surfaces with the post and also assure good electrical contact therewith. The planar member is also provided with a tab which in the illustrated embodiment is easily bent to form a ground contact which permits connection of the invention to electrical ground. The novelty of the grounding guard of the invention will be evident from the lack of any comparable device in the literature. The elegance of the invention is evident from the effective, low-cost solution provided by the invention; a solution to a problem that could otherwise render an expensive system useless and yet has not been effectively addressed in the prior art.

OBJECTS OF THE INVENTION

It is therefore a principal object of the present invention to provide a grounding guard for post-type force transducers to prevent damaging static electric discharge current from reaching delicate circuitry.

It is another object of the invention to provide an improved post-type, strain gauge implemented force transducer having a grounding guard in intimate contact with the post to prevent damage to the strain gauges from a discharge of static electrical energy.

It is still another object of the invention to provide a grounding guard for manually operated electrical devices of the type having an elongated member for engagement by an operator, the guard being configured for overlying at least a portion of the elongated member without interfering with the normal operation of the electrical device.

It is still another object of the invention to provide a grounding guard for addition to manually operated electrical devices of the type having an elongated member for engagement by an operator, the guard being configured for overlying at least a portion of the elongated member and for being connected to electrical ground without altering the original configuration of the electrical device.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the following drawings in which:

FIG. 3 is an exploded view of the invention.

DETAILED DESCRIPTION OF THE INVENTION

Figure 1:
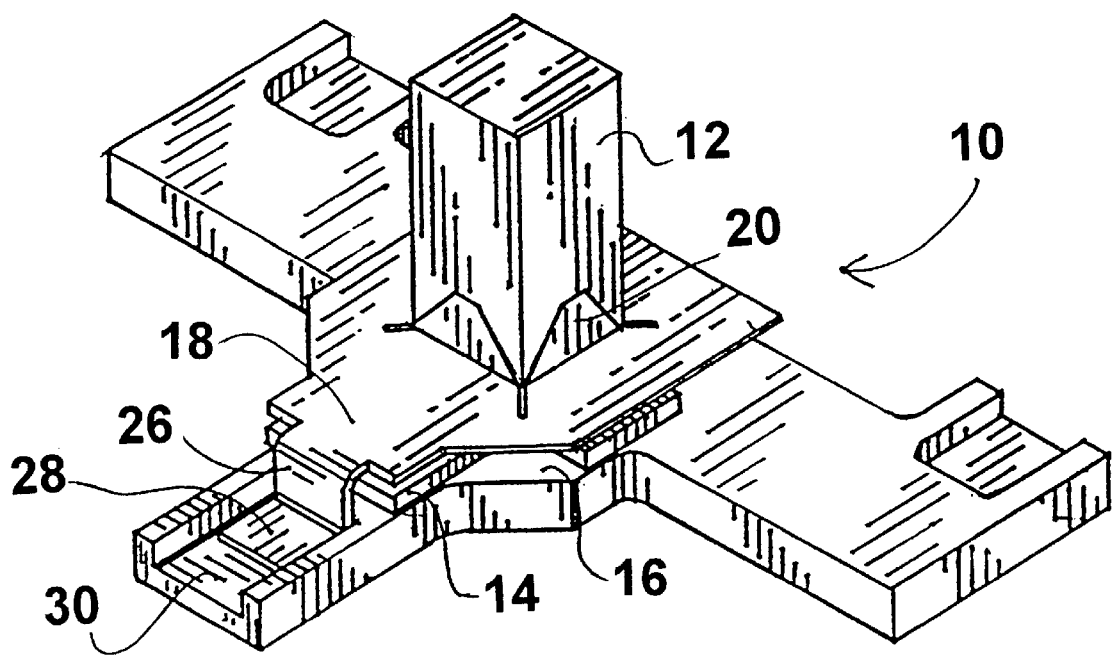
FIG. 1 is a three-dimensional view of an improved force transducer in accordance with the preferred embodiment and showing the invention in its assembled configuration.
Figure 2:
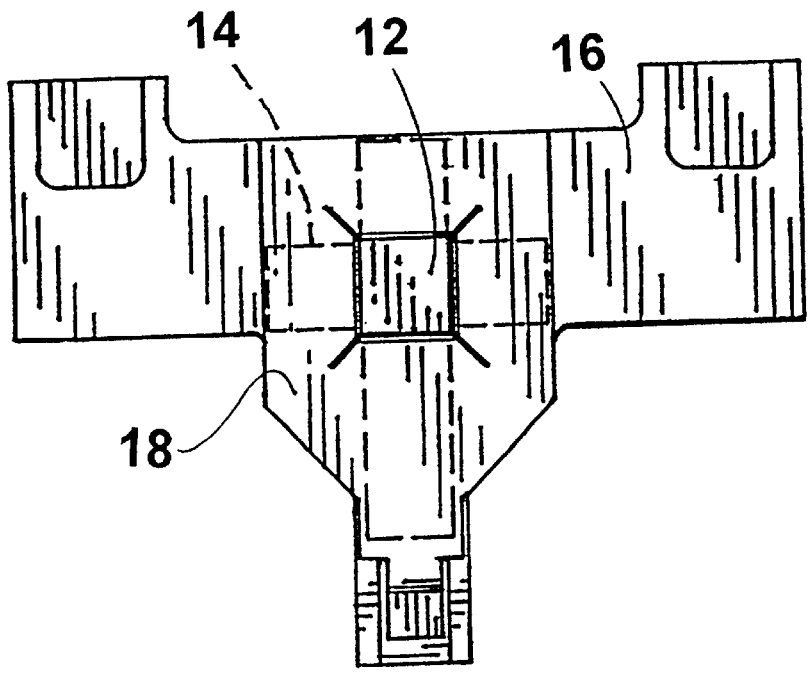
FIG. 2 is a top view of the invention.

Referring to the accompanying figures it will be seen that an improved force transducer 10 in a preferred embodiment, comprises a post 12 that is either affixed to (by epoxy or the like) or integral to a generally planar substrate 14. The substrate comprises a plurality of strain gauges 15 on the surface of the substrate 14 opposed to the post 12. The post 12 and substrate 14 may be made of a ceramic material to resist wear and to provide predictable bending distortion in response to mechanical force to the free end of the post. The strain gauges 15 respond to such bending by altering their respective electrical resistances, thereby facilitating conversion of force magnitude and direction into corresponding electrical parameters.

The force transducer 10 also comprises an underlying support and connection member 16 which preferably comprises a unitary generally planar structure having an elongated portion 17, a central extension 19 and oppositely located lateral extensions 21 and 23. The shape of member 16, in the disclosed embodiment, is designed to provide firm support for the transducer irrespective of the magnitude of the bending forces applied to the post 12. Elongated portion 17 tends to resist forces applied in one direction (i.e., "x") while extensions 19, 21 and 23 tend to resist forces applied in a second direction (i.e. "y". Member 16 also provides a plurality of electrically conductive circuit contacts 30, 32 and 34 in respective recesses within extensions 19, 21 and 23, respectively. Member 16 provides wiring, such as printed metallic lines (not shown), which contact the strain gauges 15 to other circuits by means of the circuit contacts 30, 32 and 34.

The inventive improvement herein resides principally in a ground guard 18 which provides the protection against static electric discharge such as discharge resulting from human contact with the free end 13 of post 12. Guard 18 comprises a generally planar surface 22 of a highly electrically conductive material such as copper or copper alloy or other equal or superior conductor. At about the center of surface 22, there are a plurality of trapezoidally shaped flaps 20 which are folded to be generally perpendicular to surface 22 and which leave an opening 24 which substantially conforms to the cross-sectional shape and size of post 12. A plurality of corner shots or gaps 25 may also be provided to facilitate bending of the flaps 20 and to provide a spring-like yielding of the flaps for good mechanical contact with the post 12.

At a narrowed portion 27 of guard 18, the metal surface is bent twice to form a flange 26 from which there extends a ground contact tab 28. As seen best in FIG. 1, when transducer 10 is fully assembled, guard 18 rests on substrate 14 and surrounds post 12 with flaps 20 in intimate engagement with the post immediately above the substrate. Furthermore, flange 26 curves over the adjacent edge of the substrate, allowing ground contact tab 28 to engage the circuit contact 30 of member 16.

In the event of a static electric discharge from an operator's hand to post 12, the resulting static electric current is grounded through one or more flaps 20, through surface 22, flange 26 and ground contact tab 28 to a suitable circuit ground connected by a wire (not shown) to circuit contact 30.

Having thus provided an enabling disclosure of a preferred embodiment incorporating the currently contemplated best mode of the invention, it being understood that the disclosed embodiment is merely illustrative and not necessarily limiting of the scope hereof, what we claim is:

1. An improved force transducer of the type having an elongated post attached to an underlying substrate having strain gauges for providing electrical manifestations corresponding to the magnitude and direction of a force applied to the post in at least one plane; the improvement comprising:

a grounding guard made of an electrically conductive, substantially planar material and configured for surrounding said post in intimate contact therewith and for overlying said substrate, said guard having means for electrical connection to ground potential of said force transducer for diverting static discharge current from said post to electrical ground to prevent damage to said strain gauges.

2. The improvement recited in claim 1 said grounding guard comprising a plurality of flaps formed in said planar material and bent out of the plane of said material to form an aperture for receiving said post.

3. The improvement recited in claim 1 wherein said means for electrical connection comprises a flange on said guard, said flange having a grounding contact tab extending therefrom.

4. The improvement recited in claim 1 wherein said force transducer also has an underlying support member for receiving and supporting said substrate, said support member having at least one electrical contact for connection to transducer ground, and wherein said means for electrical connection of said guard comprises a conductive member shaped to engage said electrical contact of said support member.

5. The improvement recited in claim 2 said grounding guard further comprising at least one slit between respective flaps for limiting interference of said guard with movement of said post.

6. A force transducer for converting applied mechanical force into corresponding electrical signals; the transducer comprising:

a post having a free end for receiving said force and also having a non-free end;

a substrate underlying said post and being affixed to said non-free end;

a plurality of strain sensors on said substrate in proximity to said post and being responsive to said force for changing an electrical parameter as a result of strain induced in said substrate by said force; and a grounding guard overlying said substrate and in contact with said post for preventing static discharge current from said post from reaching said strain sensors.

7. The force transducer recited in claim 6 wherein said guard comprises an electrically conductive, substantially planar material and is configured for surrounding said post in intimate contact therewith.

8. The force transducer recited in claim 7 said grounding guard comprising a plurality of flaps formed in said planar material and bent out of the plane of said material to form an aperture for receiving said post.

9. The force transducer recited in claim 8 said grounding guard further comprising at least one slit between respective flaps for limiting interference of said guard with movement of said post.

10. The force transducer recited in claim 7 wherein said material is taken from the group consisting of copper, copper alloys and metals having electrical conductivity at least equal to that of copper.

\* \* \* \* \*